United States Patent
Webster (10) Patent No.: US 9,323,474 B2
(45) Date of Patent: Apr. 26, 2016

(54) SELECTIVE ZONE CONTROL SESSION TERMINATION

(71) Applicant: International Business Machines Corporation, Armonk, NY (US)

(72) Inventor: Kevin J. Webster, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 13/784,189

(22) Filed: Mar. 4, 2013

(65) Prior Publication Data

US 2014/0250233 A1   Sep. 4, 2014

(51) Int. Cl.

| G06F 15/16 | (2006.01) |
|---|---|
| G06F 3/06 | (2006.01) |
| H04L 29/06 | (2006.01) |
| H04L 29/08 | (2006.01) |
| H04L 12/24 | (2006.01) |
| H04L 12/26 | (2006.01) |

(52) U.S. Cl.
CPC ............ *G06F 3/067* (2013.01); *H04L 65/1066* (2013.01); *H04L 67/1097* (2013.01); *H04L 67/141* (2013.01); *H04L 41/0803* (2013.01); *H04L 41/0813* (2013.01); *H04L 41/50* (2013.01); *H04L 43/0811* (2013.01)

(58) Field of Classification Search
CPC ............ H04L 67/1097; H04L 65/1066; H04L 67/141; H04L 41/0813; H04L 43/0811; H04L 41/50; H04L 41/0803; G06F 3/067
USPC .......................................... 709/227, 223–224
See application file for complete search history.

(56) References Cited

U.S. PATENT DOCUMENTS

| 7,051,101 | B1 * | 5/2006 | Dubrovsky et al. ........... 709/225 |
|---|---|---|---|
| 7,352,740 | B2 | 4/2008 | Hammons et al. |
| 7,633,955 | B1 * | 12/2009 | Saraiya et al. ................. 370/401 |
| 7,653,712 | B1 * | 1/2010 | Dubrovsky et al. ........... 709/223 |
| 7,729,288 | B1 | 6/2010 | Betker |
| 7,827,260 | B2 | 11/2010 | Huston et al. |
| 7,934,018 | B1 | 4/2011 | Lavallee et al. |
| 8,151,318 | B1 * | 4/2012 | DeSanti et al. .................... 726/3 |
| 2003/0195956 | A1 * | 10/2003 | Bramhall .............. G06F 3/0601 709/223 |
| 2004/0230757 | A1 * | 11/2004 | Brice et al. ..................... 711/163 |
| 2005/0262233 | A1 | 11/2005 | Alon et al. |
| 2010/0040053 | A1 | 2/2010 | Gottumukkula et al. |
| 2012/0278584 | A1 * | 11/2012 | Nagami ................ G06F 3/0607 711/170 |

FOREIGN PATENT DOCUMENTS

| EP | 1492308 A2 | 12/2004 |
|---|---|---|
| WO | WO2009/156451 A1 | 12/2009 |

OTHER PUBLICATIONS

Nibhanupudi, Krishna et al., "Data Center Ethernet", CSE 533: Project Report Spring 2009, 19 pages.

\* cited by examiner

*Primary Examiner* — Jungwon Chang

(74) *Attorney, Agent, or Firm* — Stephen R. Tkacs; Stephen J. Walder, Jr.; Feb R. Cabrasawan (57) ABSTRACT

A mechanism is provided in a data processing system for selective zone control session termination. A zone control service executing in the data processing system creates logical zoning definitions in memory for each client session. Each client session attempts to make changes to a fabric. Responsive to the zone control service receiving a request to commit a session from a given client and changes made by the given client during the session not conflicting with changes made by another client in a concurrent session based on the logical zoning definitions, the zone control service applies the changes made by the given client during the session to the fabric.

17 Claims, 4 Drawing Sheets

SELECTIVE ZONE CONTROL SESSION TERMINATION

BACKGROUND

The present application relates generally to an improved data processing apparatus and method and more specifically to mechanisms for selective zone control session termination.

Fibre Channel, or FC, is a high-speed network technology primarily used for storage networking. Fibre Channel was primarily used in the supercomputer field, but has now become the standard connection type for storage area networks (SAN) in enterprise storage. Despite its name. Fibre Channel signaling can run on twisted pair copper wire in addition to fiber-optic cables. Fibre Channel Protocol (FCP) is a transport protocol (similar to TCP used in Internet Protocol (IP) networks) that predominantly transports Small Computer Systems Interface (SCSI) commands over Fibre Channel networks.

SUMMARY

In one illustrative embodiment, a method, in a data processing system, is provided for selective zone control session termination. The method comprises creating, by a zone control service executing in the data processing system, logical zoning definitions in memory for each client session. Each client session attempts to make changes to a fabric. The method further comprises responsive to the zone control service receiving a request to commit a session from a given client and changes made by the given client during the session not conflicting with changes made by another client in a concurrent session based on the logical zoning definitions, applying, by the zone control service, the changes made by the given client during the session to the fabric.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for selective zone control session termination. In Fibre Channel switch fabrics, zone control changes are invoked against a fabric to build and activate zoning to allow communications within a zone. It is possible for two different storage administrators to attempt two separate zone control changes against the same fabric within the overlapping sessions. A zone control service executing in the data processing system creates logical zoning definitions in memory for each client session. Each client session attempts to make changes to a fabric. Responsive to the zone control service receiving a request to commit a session from a given client, the zone control service determines whether changes made by the given client during the session conflict with changes made by another client in a concurrent session based on the logical zoning definitions. If the changes do not conflict, the zone control service applies the changes made by the given client during the session to the fabric. If the changes conflict with changes made by another client in a concurrent session, the zone control service terminates the session and returns a failure notification.

Figure 1:
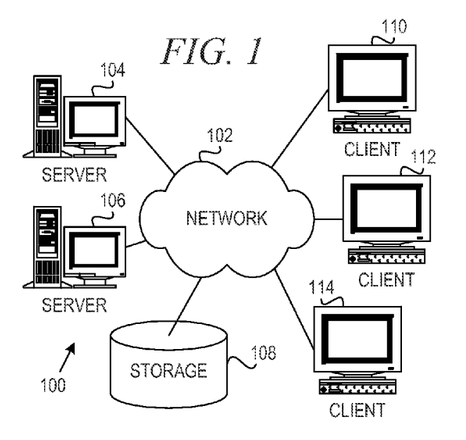
FIG. 1 depicts a pictorial representation of an example distributed data processing system in which aspects of the illustrative embodiments may be implemented.
Figure 2:
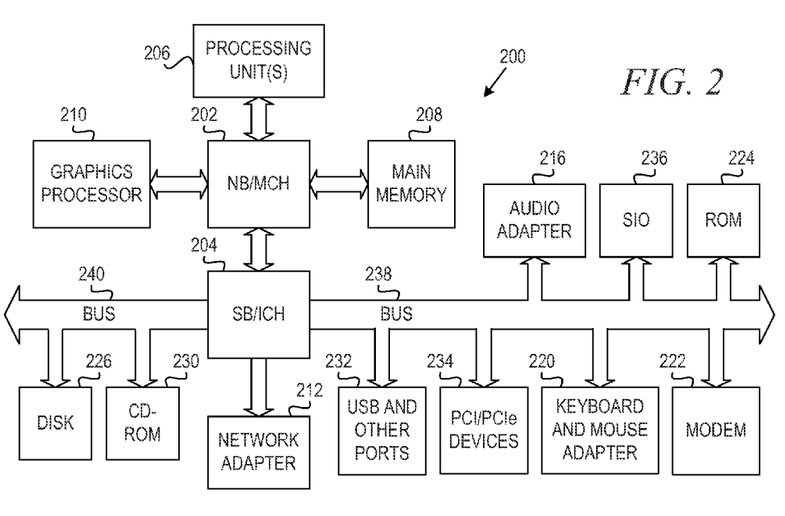
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, network 102 is a Fibre Channel fabric. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Distributed data processing system 100 may run a zone service, likely as part of a larger storage resource management application. This system has a client interface, a server, and storage. This may all reside on the same system or may be distributed. The zone service may also instead reside on a Fibre Channel switch itself.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates).

As a server, data processing system 200 may be, for example, an IBM® eServer™ System P® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
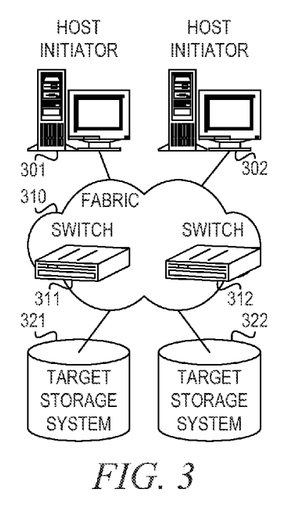
FIG. 3 depicts a pictorial representation of an example storage area network in which aspects of the illustrative embodiments may be implemented.

FIG. 3 depicts a pictorial representation of an example storage area network in which aspects of the illustrative embodiments may be implemented. Host initiators 301, 302 connect through fabric 310 to target storage systems 321, 322. The fabric 310 of the managed network may be a Fibre Channel fabric. Fibre Channel switches 311, 312 are zoned such that certain host initiators 301, 302 can access certain target storage systems 321, 322. The fabric 310 may also be a Fibre Channel over Ethernet (FcoE) fabric, comprised of host initiators with Converged Network Adapter initiators, switches that support Fibre Channel over Converged Enhanced Ethernet, and target storage.

If the Fibre Channel switch vendor allows two zone control sessions to overlap, then an unstable zoning situation may result. On the other hand, if the Fibre Channel switch vendor has session termination in place, then one or both of the zone control sessions will fail to commit zone control changes. That is, current implementations terminate overlapping zone control sessions no matter what is being changed by the sessions. One or both are terminated simply because the sessions overlap.

In accordance with the illustrative embodiments, a zone control service allows concurrent zone control sessions to complete successfully and fail only those zone control sessions that overlap and have changes to the zoning in the sessions that would affect the entities included in the concurrent sessions.

In larger data centers, such as cloud data centers backed by a Fibre Channel storage area network (SAN), more and more rapid changes are needed for the fabric. Adding host initiators and storage targets to a fabric and zoning them to intercommunicate may be a frequent task in such a data center. Time-consuming, and thus costly, change control procedures may be in place in a data center to ensure that zone control sessions do not occur in the same window of time. Such change control procedures may be unnecessary when expanding a fabric with new initiators to be paired with new targets.

As an example, two storage administrators may create their own new zones and add world-wide port names (wwpns) as members to these zones, which are from new initiators and targets recently added to the fabric. Thus, these wwpns are in no other zone, and they are being added into two separate zones by two different storage administrators, where the wwpns are not shared, and possibly not even known to the other storage administrator. When creating these zones in concurrent sessions, there is no risk that the other zone control session to add other initiator-to-target communication will be impacted. In other words, switch vendors needlessly terminate some zone control sessions when, in fact, these zone control sessions could complete successfully with no impact to each other.

The zone control service of the illustrative embodiments allows two or more zone control sessions to overlap in the same window of time and allows the sessions to succeed in cases where the changes have no impact on each other. The zone control service terminates a session or sessions with a failure if the sessions have logical conflicts with each other. The illustrative embodiments allow data center storage administrators to expand their fabrics with new host initiators and new storage targets without risking zone control failures because of concurrent sessions. The illustrative embodiments prevent zone control changes that conflict with other changes in progress while allowing concurrent zone control changes that do not cause conflict.

The zone control service of the illustrative embodiments may be part of a storage resource manager (SRM) software application where multiple storage administrators may invoke zone control against the same fabric in the same window of time. Also, the zone control service may be embedded in a switch itself.

Figure 4:
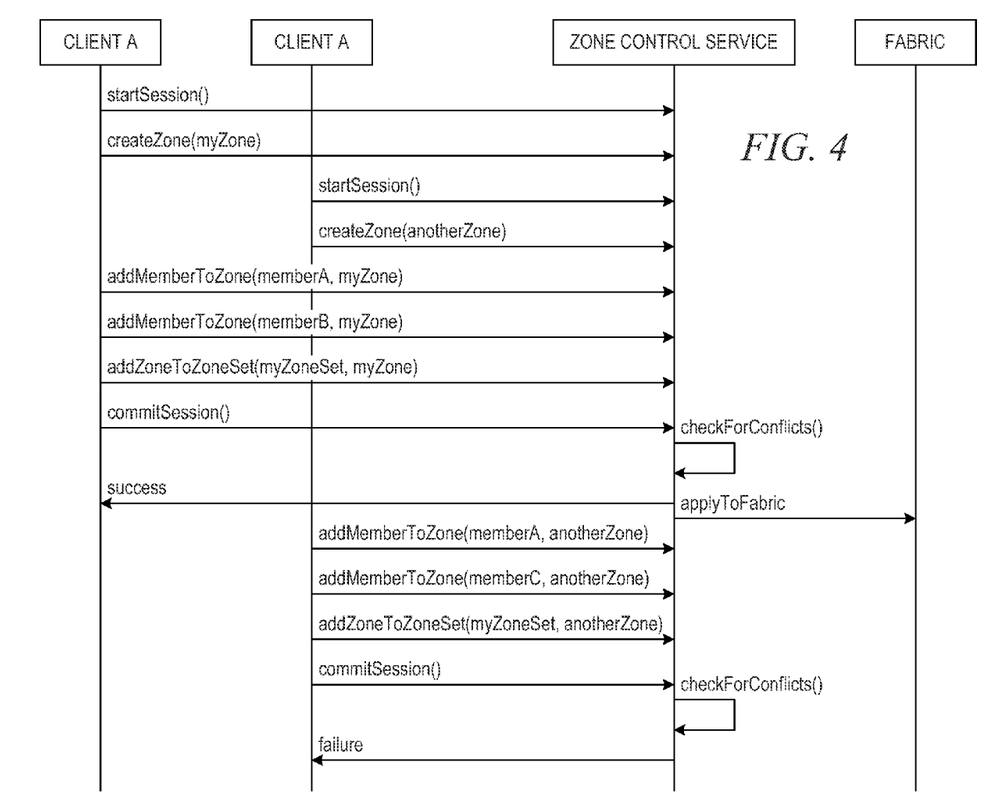
FIG. 4 is an example sequence diagram depicting two clients invoking concurrent zone control sessions through a zone control service in accordance with an illustrative embodiment.

FIG. 4 is an example sequence diagram depicting two clients invoking concurrent zone control sessions through a zone control service in accordance with an illustrative embodiment. Each session has a start session, a series of changes applied to the zoning database, and a commit session to commit the changes to the zoning database on the fabric.

A first client, client A, starts a session with the zone control service by calling startSession( ). Client A attempts to create a zone called myZone by calling createZone(myZone). A second client, client B, starts a session with the zone control service by calling startSession( ). Client B attempts to create a zone called anotherZone by calling createZone(anotherZone). Thus, client A and client B are concurrent, or overlapping, zone control sessions.

Client A attempts to add members (memberA, memberB) to the zone, myZone, by calling addMemberToZone(memberA, myZone) and addMemberToZone(memberB, myZone). Client A attempts to add the zone, myZone, to a zone set, myZoneSet, by calling addZoneToZoneSet(myZoneSet, myZone). Client A attempts to commit the session by calling commitSession( ). The zone control service calls checkForConflicts( ) to determine whether the session that client A is attempting to commit conflicts with a concurrent session of another client, such as client B. In the depicted example, client B has not yet attempted to commit changes to the fabric that would conflict with the zone control changes being made by client A. Therefore, the zone control service returns a success notification to client A and applies the changes to the fabric.

Client B attempts to add members (memberA, memberC) to the zone, anotherZone, by calling addMemberToZone(memberA, anotherZone) and addMemberToZone(memberC, anotherZone). Client B attempts to add the zone, anotherZone, to a zone set, myZoneSet, by calling addZoneToZoneSet(myZoneSet, anotherZone). Client B attempts to commit the session by calling commitSession( ). The zone control service calls checkForConflicts( ) to determine whether the session that client B is attempting to commit conflicts with a concurrent session of another client.

In the depicted example, the change by client B to add memberA to anotherZone conflicts with the change by client A to add memberA to myZone. Therefore, the zone control service returns a failure notification to client B. The administrator may check the zoning definition and determine whether the changes should be applied. The administrator may identify the conflict and modify the zone control changes.

The checkpoints for determining whether to allow the change to be applied successfully to the fabric or to fail because of concurrent sessions that would impact each other are at the points where the zone control service calls checkForConflicts( ), i.e., after each call to commitSession( ). The zone control service determines if the changes can be applied to the fabric or if they would conflict with a session that committed since the current session began. For instance, when client A calls commitSession( ), then the changes can be applied to the fabric, because no other client has called commitSession( ) between when client A called startSession( ) and when client A called commitSession( ).

When client B calls commitSession( ), then the zone control service identifies that another client (client A) committed a session in the time between when client B called startSession( ) and client B called commitSession( ). Thus, client B's changes must be checked for conflicts against client A's changes. If checkForConflicts( ) succeeds, an alternate implementation may apply the change to the fabric, wait for that change to be applied successfully, and then inform the client that the session committal succeeded. This could be beneficial so that if there are any errors reported by the fabric (unrelated to session conflicts) then the zone service can provide a proper return response to the client.

The logic to determine whether two sessions' changes have conflicts is as follows:

The zone control service keeps a record in memory of each action performed against a fabric by each session.

The records of the actions are flags against the logical zoning entity instances.

Any zone member added to or removed from a zone or alias is flagged. Two members of different types can be considered equivalent. For example, members may be equivalent if a port wwn member has an equivalent Fibre Channel identification (fcid) member, has an equivalent domain/port member, and has an equivalent node wwn member. All these member types can be used to zone the same thing. Any member type has an equivalent logical port wwn member or set of port wwn members and so logical port wwn members are flagged for any zone member type.

Any aliases added to or removed from a zone are flagged.

Any member that is flagged also causes all scoping zones to be flagged.

Any member that is flagged also causes all scoping aliases to be flagged.

Any alias that is flagged also causes all scoping zones to be flagged.

Zone sets that are created or deleted are flagged.

Zone sets that have zones added or removed are not flagged, but the zones that were added or removed are flagged. The zone sets are not flagged to allow zones to be added to or removed from a zone set through merged zone sets. Because zones define what initiators and targets can communicate, adding and removing zones should not flag the zone set.

Zones that are created or deleted are flagged.

If any flagged items from one session are also flagged by another session, then a conflict exists.

Zone set activation, which can sometimes occur outside of a session, is treated as a startSession( ) and completeSession( ) in and of itself, where the zone set is flagged, the zones within the zone set are flagged, and the members within the zones are flagged.

When all sessions for a fabric are complete, then the records of actions against the fabric are cleared.

The same member used multiple times by one session but not used at all by the other session does not cause a conflict.

Figure 5:
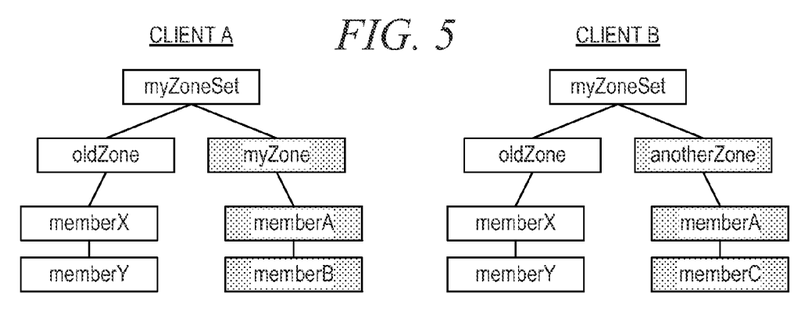
FIG. 5 depicts example logical zoning definitions held in memory by a zone control service in accordance with an illustrative embodiment.

FIG. 5 depicts example logical zoning definitions held in memory by a zone control service in accordance with an illustrative embodiment. The zone control service compares the logical zoning definitions in memory for each session. Flagged entities, according to the logic described above, are shaded. When client B commits its session, the zone control service compares the flagged entities.

The zone, myZone, from client A has no matching flagged entity from client B; therefore, creating myZone does not cause a session termination. The zone, anotherZone, from client B has no matching flagged entity from client A; therefore, creating anotherZone does not cause a session termination. The member, memberA, from client A has a matching flagged entity from client B. This causes client B's session to be terminated. The other flagged entities have no matching flagged entities in the other session; however, the session is terminated due to adding memberA.

Storage resource management applications typically point to one switch in a fabric or to an intermediate data source that points to one switch in the fabric. Concurrent zone control sessions against a separate switch in the fabric, whether directly against the switch through for instance a command line interface or through a separate data source pointed at the separate switch, are still exposed to the transaction termination logic of the switches.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
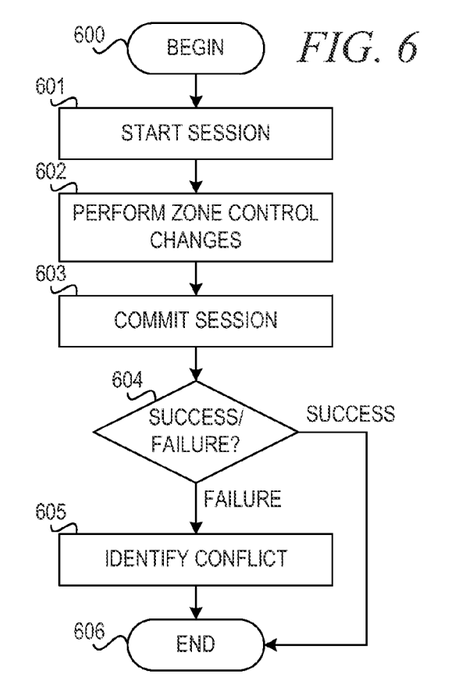
FIG. 6 is a flowchart illustrating operation of a client for invoking a zone control session in accordance with an illustrative embodiment.

FIG. 6 is a flowchart illustrating operation of a client for invoking a zone control session in accordance with an illustrative embodiment. Operation begins (block 600), and the client starts a session with a zone control service (block 601). The client attempts to perform zone control changes by making calls to the zone control service (block 602). The client then commits the session (block 603) and receives notification of success or failure from the zone control service.

The client then determines whether the session commit results in a success or failure (block 604). If the session commit results in a failure, then the administrator may identify the conflict and determine if any changes must be applied (block 605). Thereafter, or if the session commit results in a success in block 604, operation ends (block 606).

Figure 7:
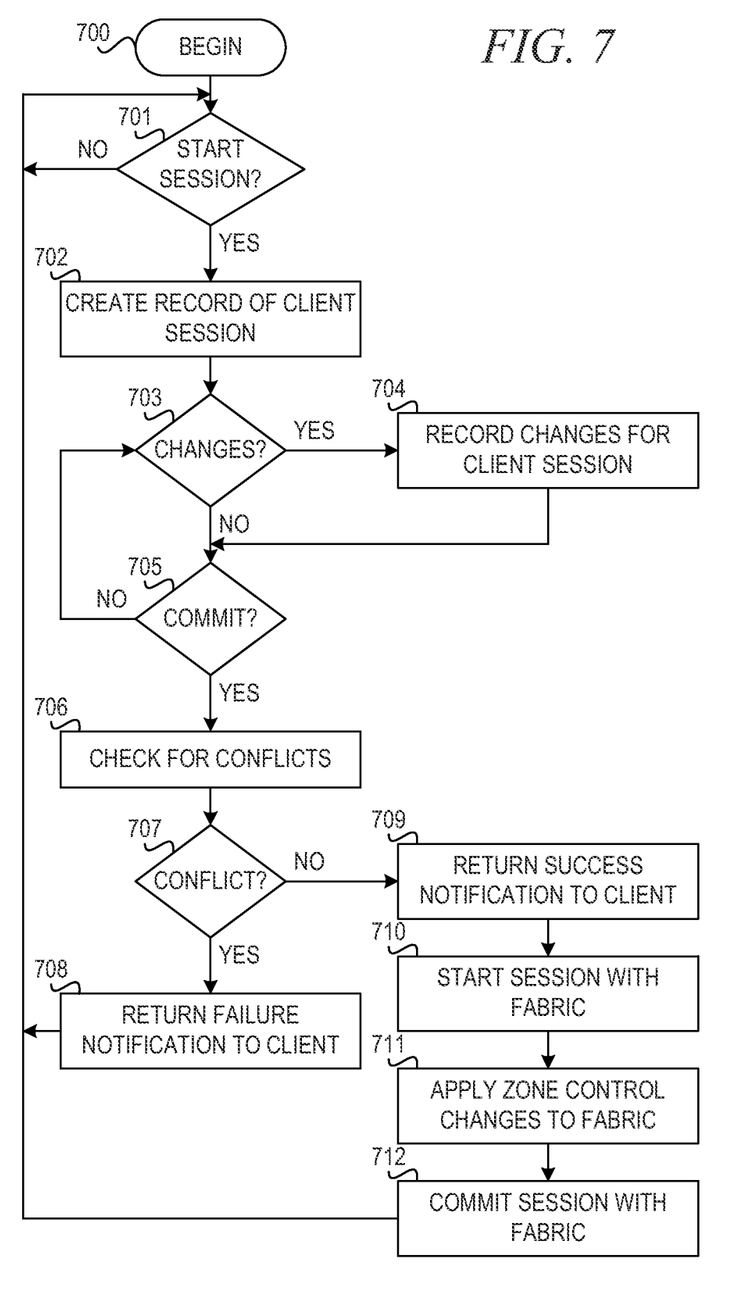
FIG. 7 is a flowchart illustrating operation of a zone control service for selective zone control session termination in accordance with an illustrative embodiment.

FIG. 7 is a flowchart illustrating operation of a zone control service for selective zone control session termination in accordance with an illustrative embodiment. Operation begins (block 700), and the zone control service determines whether a call is received from a client to start a zone control session (block 701). If a start session call is not received, operation returns to block 701 to determine whether a start session call is received. The zone control service should not allow a client to perform zone control changes unless the client first starts a session.

If a start session call is received, the zone control service creates a record of logical zoning definitions for the client session in memory (block 702). Thereafter, the zone control service determines whether a call is received to perform a zone control change (block 703). If a zone control change is received, the zone control service records the changes for the client session (block 704).

Thereafter, or if the zone control service does not receive a zone control change in block 703, the zone control service determines whether a session commit is received from a client (block 705). If the zone control service does not receive a session commit, operation returns to block 703 to determine whether a call is received to perform a zone control change. Operation repeats until a session commit is received in block 705, or a session timeout or session termination.

Zone control services may have timeout mechanisms such that if a max time period is reached and no call to commit( ) is received, the session is terminated. Similarly, zone control services may have mechanisms to allow the client to terminate an in-progress session. For instance, a call to terminate the session may be received instead of a call to commit the session. In both of these cases (timeout or terminate session), any changes received by the client during the session are abandoned, no check for conflicts occur, and no changes are applied to the fabric.

If a session commit call is received in block 705, the zone control service checks for conflicts (block 706) and determines whether conflicts exist for the session being committed (block 707). If the changes being committed in the client session conflict with other changes being made in another client session, the zone control service returns a failure notification to the client (block 708). Thereafter, operation returns to block 701 to determine whether a start session call is received.

If the changes being committed in the client session do not conflict with other changes being made in another client session, the zone control service returns a success notification to the client (block 709). Then, the zone control service starts a session with the fabric (block 710) and applies the zone control changes to the fabric (block 711). The zone control service then commits the session with the fabric (block 712). Thereafter, operation returns to block 701 to determine whether a start session call is received. As described above, an alternate implementation may first apply the zone control changes to the fabric and then return a success notification to the client.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for selective zone control session termination. The mechanisms allow two or more zone control sessions of Fibre Channel switch fabrics to overlap in the same window of time and for both to succeed in cases where the sessions' changes have no impact on each other. The mechanisms terminate a session or sessions with a failure if the sessions have logical conflicts with each other. The control mechanism allows data center storage administrators to expand their fabric with new host initiators and new storage targets without risking zone control failures because of concurrent sessions and prevents zone control changes that conflict with other changes in progress concurrently, while allowing concurrent zone control changes that do not cause conflict.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:
    create, by a zone control service executing in the computing device, logical zoning definitions in memory for each client session within a plurality of concurrent client sessions, wherein each client session attempts to make changes to a fabric, wherein creating logical zoning definitions comprises flagging a zone member added to or removed from a zone or alias, flagging an alias added to or removed from a zone, flagging a zone set that is created or deleted, or flagging a zone added to or removed from a zone set, and wherein flagging a zone member causes all scoping zones to be flagged, wherein flagging a zone member causes all scoping aliases to be flagged, and wherein flagging an alias causes all scoping zones to be flagged; and
    responsive to the zone control service receiving a request to commit a session from a given client and changes made by the given client during the session not conflicting with changes made by another client in a concurrent session based on the logical zoning definitions, apply, by the zone control service, the changes made by the given client during the session to the fabric, wherein applying the changes made by the given client during the session to the fabric comprises starting a zone control session between the zone control service and the fabric, applying the changes made by the given client using the zone control service with the fabric, and committing, by the zone control service, the zone control session with the fabric.

2. The computer program product of claim 1, wherein creating logical zoning definitions comprises keeping a record of each action performed against the fabric by each client session.

3. The computer program product of claim 1, wherein the computer readable program further causes the computing device to:
    responsive to receiving the request to commit the session from a given client and changes made by the given client during the session not conflicting with changes made by another client in a concurrent session based on the logical zoning definitions, return a success notification from the zone control service to the given client.

4. The computer program product of claim 1, wherein the computer readable program further causes the computing device to:
    responsive to receiving the request to commit the session from the given client and changes made by the given client during the session conflicting with changes made by another in a concurrent session based on the logical zoning definitions, terminate the session and return a failure notification to the given client.

5. The computer program product of claim 1, wherein the computing device comprises a switch in the fabric.

6. The computer program product of claim 1, wherein the computer readable program comprises a storage resource management application.

7. The computer program product of claim 6, wherein the computer readable program is stored in a non-transitory computer readable storage medium in a data processing system and wherein the computer readable program was downloaded over a network from a remote data processing system.

8. The computer program product of claim 6, wherein the computer readable program is stored in a non-transitory computer readable storage medium in a server data processing system and wherein the computer readable program is downloaded over a network to a remote data processing system for use in a non-transitory computer readable storage medium with the remote system.

9. An apparatus, comprising:
    a processor; and
    a memory coupled to the processor, wherein the memory comprises instructions which, when executed by the processor, cause the processor to:
    create, by a zone control service executing within the apparatus, logical zoning definitions in memory for each client session within a plurality of concurrent client sessions, wherein each client session attempts to make changes to a fabric, wherein creating logical zoning definitions comprises flagging a zone member added to or removed from a zone or alias, flagging an alias added to or removed from a zone, flagging a zone set that is created or deleted, or flagging a zone added to or removed from a zone set, and wherein flagging a zone member causes all scoping zones to be flagged, wherein flagging a zone member causes all scoping in aliases to be flagged, and wherein flagging an alias causes all scoping zones to be flagged; and
    responsive to the zone control service receiving a request to commit a session from a given client and changes made by the given client during the session not conflicting with changes made by another client in a concurrent session based on the logical zoning definitions, apply, by the zone control service, the changes made by the given client during the session to the fabric, wherein applying the changes made by the given client during the session to the fabric comprises starting a zone control session between the zone control service and the fabric, applying the changes made by the given client using the zone control service with the fabric, and committing, by the zone control service, the zone control session with the fabric.

10. The apparatus of claim 9, wherein creating logical zoning definitions comprises keeping a record of each action performed against the fabric by each client session.

11. The apparatus of claim 9, wherein the instructions further causes the processor to:
responsive to receiving the request to commit the session from a given client and changes made by the given client during the session not conflicting with changes made by another client in a concurrent session based on the logical zoning definitions, return a success notification from the zone control service to the given client.

12. The apparatus of claim 9, wherein the instructions further causes the processor to:
responsive to receiving the request to commit the session from the given client and changes made by the given client during the session conflicting with changes made by another in a concurrent session based on the logical zoning definitions, terminate the session and return a failure notification to the given client.

13. The apparatus of claim 9, wherein the apparatus comprises a switch in the fabric.

14. A method, in a data processing system, for selective zone control session termination, the method comprising:
creating, by a zone control service executing in the data processing system, logical zoning definitions in memory for each client session within a plurality of concurrent client sessions, wherein each client session attempts to make changes to a fabric, wherein creating logical zoning definitions comprises flagging a zone member added to or removed from a zone or alias, flagging an alias added to or removed from a zone, flagging a zone set that is created or deleted, or a zone added to or removed from a zone set, and wherein flagging a zone member causes all scoping zones to be flagged, wherein flagging a zone member causes all scoping aliases be flagged, and wherein flagging an alias causes all scoping zones to be flagged; and
responsive to the zone control service receiving a request to commit a session from a given client and changes made by the given client during the session not conflicting with changes made by another client in a concurrent session based on the logical zoning definitions, applying, by the zone control service, the changes made by the given client during the session to the fabric, wherein applying the changes made by the given client during the session to the fabric comprises starting a zone control session between the zone control service and the fabric, applying the changes made by the given client using the zone control service with the fabric, and committing, by the zone control service, the zone control session with the fabric.

15. The method of claim 14, wherein creating logical zoning definitions comprises keeping a record of each action performed against the fabric by each client session.

16. The method of claim 14, further comprising:
responsive to receiving the request to commit the session from a given client and changes made by the given client during the session not conflicting with changes made by another client in a concurrent session based on the logical zoning definitions, returning a success notification from the zone control service to the given client.

17. The method of claim 14, further comprising:
responsive to receiving the request to commit the session from the given client and changes made by the given client during the session conflicting with changes made by another in a concurrent session based on the logical zoning definitions, terminating the session and returning a failure notification to the given client.

* * * * *